(12) United States Patent
Okamura et al.

(10) Patent No.: US 9,635,225 B2
(45) Date of Patent: Apr. 25, 2017

(54) IMAGING DEVICE

(71) Applicant: PANASONIC INTELLECTUAL PROPERTY MANAGEMENT CO., LTD., Osaka (JP)

(72) Inventors: Shinichiro Okamura, Fukuoka (JP); Takashi Nanba, Fukuoka (JP); Hiroki Yamanaka, Fukuoka (JP); Toshiaki Ito, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/851,185

(22) Filed: Sep. 11, 2015

(65) Prior Publication Data

US 2016/0088199 A1    Mar. 24, 2016

(30) Foreign Application Priority Data

Sep. 24, 2014  (JP) ................................. 2014-194421

(51) Int. Cl.
*H04N 7/18* (2006.01)
*H04N 5/225* (2006.01)
*G03B 17/08* (2006.01)

(52) U.S. Cl.
CPC ......... *H04N 5/2252* (2013.01); *H04N 5/2254* (2013.01)

(58) Field of Classification Search
CPC .......... G08B 13/19619; G08B 13/1963; G08B 13/19689; B60R 2011/0084;

(Continued)

(56) References Cited

U.S. PATENT DOCUMENTS 7,217,045 B2 * 5/2007 Jones ................. G08B 13/1963
                                                       348/373
7,495,703 B2 * 2/2009 Arbuckle ......... G08B 13/19619
                                                       285/420

(Continued)

FOREIGN PATENT DOCUMENTS

JP         2012-60445 A    3/2012

OTHER PUBLICATIONS

U.S. Appl. No. 14/851,600 to Shinichiro Okamura et al., which was filed on Sep. 11, 2015.

*Primary Examiner* — Trung Diep
(74) *Attorney, Agent, or Firm* — Greenblum & Bernstein, P.L.C.

(57) ABSTRACT

A imaging device includes: a case having bottom and top plate portions with an accommodation space interposed therebetween; a dome cover protruding outward from the case through an opening formed in the top plate portion; an annular support member allowing a circumferential edge portion of the dome cover to be interposed between the support member and the top plate portion; a lens unit; and an elastic member disposed between the bottom plate portion and the lens unit and allows the lens unit to be biased in a direction toward the dome cover. The lens unit includes an outer circumferential portion disposed on outside of a lens in a direction along the bottom plate portion and engaged with an inside opening of the support member, and a stepped portion provided in the outer circumferential portion and restricts movement in the direction approaching the dome cover by abutting the support member.

18 Claims, 16 Drawing Sheets

(58) Field of Classification Search
CPC ....... B60R 2011/0089; B60R 2300/103; B60S
1/0844; B60S 1/0885; G02B 27/0101;
H04N 5/2253; H04N 5/2254; G03B
17/08; G03B 37/02
See application file for complete search history.

(56) References Cited

U.S. PATENT DOCUMENTS

| | | | |
|---|---|---|---|
| 7,586,537 B2 * | 9/2009 | Konishi | H04N 5/2251 348/143 |
| 9,195,118 B2 | 11/2015 | Okamura et al. | |
| 2003/0103161 A1 * | 6/2003 | Tatewaki | G08B 13/19619 348/375 |
| 2008/0231699 A1 * | 9/2008 | Konishi | H04N 5/2251 348/143 |
| 2009/0162048 A1 * | 6/2009 | Tatewaki | G03B 17/02 396/427 |
| 2012/0062789 A1 | 3/2012 | Sasaki | |

* cited by examiner

FIG. 2
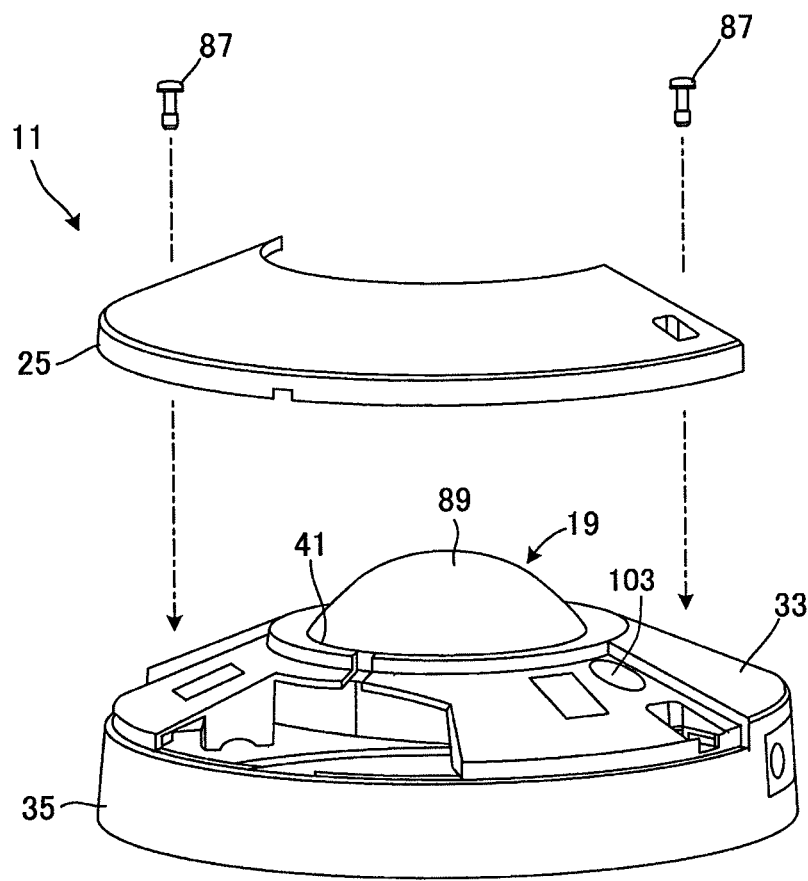
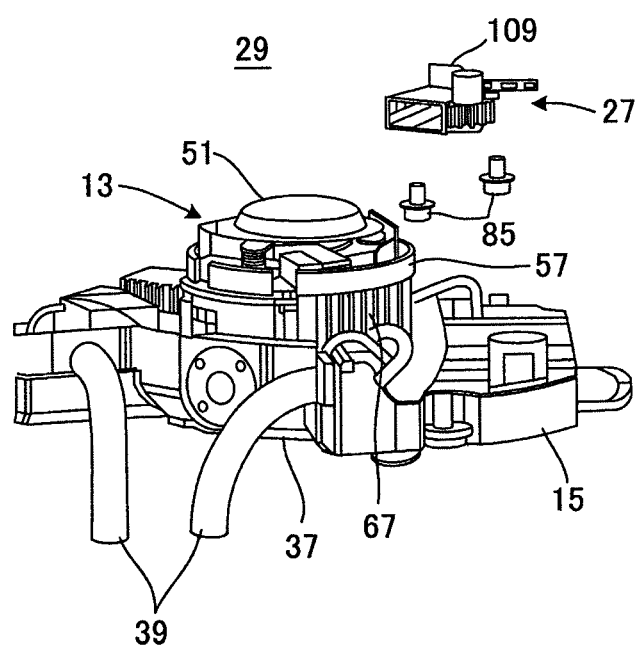

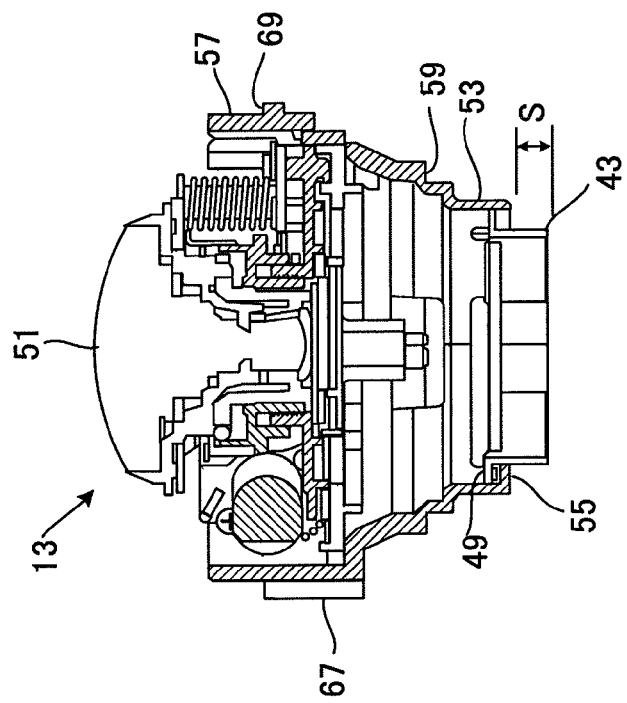
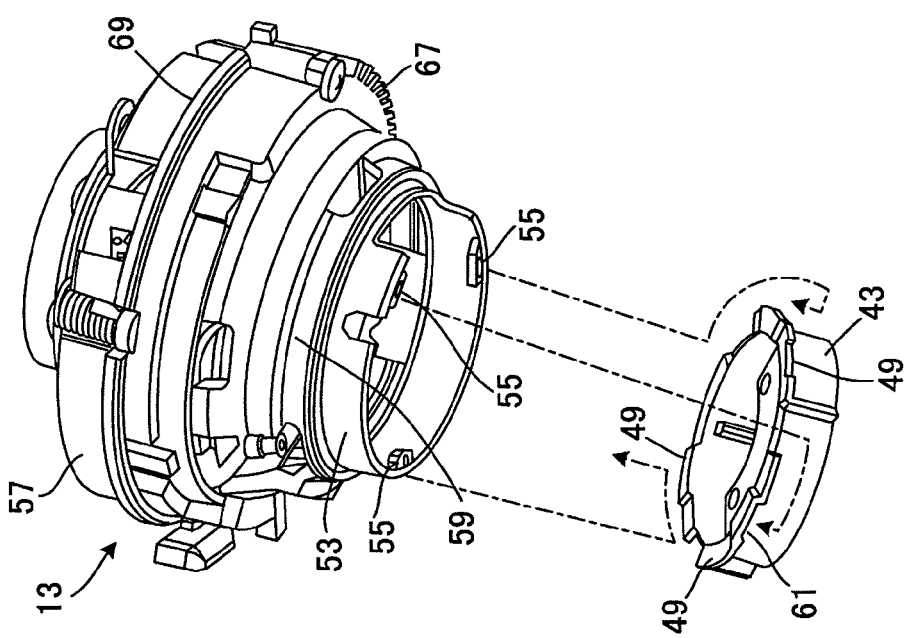

IMAGING DEVICE

BACKGROUND

1. Technical Field

This disclosure relates to a imaging device.

2. Description of the Related Art

As a imaging device having impact resistance, for example, a monitoring camera device disclosed in Japanese Patent Unexamined Publication No. 2012-60445 is known. In the monitoring camera device, as illustrated in FIG. 16, exterior unit 501 with a dome cover is fixed to fixing pedestal portion 503 by mounting screw 505 and covers an internal structure including lens unit 507. Lens unit 507 is supported by a pair of lens unit support portions 509. Lens unit support portions 509 are pivoted at a pair of support portions 513 of base portion 511. Fixing pedestal portion 503 fixes and supports base portion 511 and mounting board 515. A capturing element included in lens unit 507 is connected to mounting board 515 via transmission cable 517. Spring accommodation portion 519 of lens unit support portion 509 is fitted to protrusion 521 of lens unit 507. Protrusion 521 of lens unit 507 is pressed by elastic member 523. In a case where a predetermined impact is applied to the dome cover in the monitoring camera device, lens unit 507 is pressed in an opposite direction of the direction of a subject. As a result, lens unit 507 performs a retreat operation.

In the monitoring camera device disclosed in Japanese Patent Unexamined Publication No. 2012-60445, the lens unit is fixed to the fixing pedestal. Therefore, various components including the fixing pedestal are interposed between the dome cover and a lens. Therefore, positional deviations in the components and the like act as a cumulative tolerance, and it is difficult to ensure the positional accuracy of the dome cover and the lens. Particularly, as the capturing element has a higher pixel count, the positional relationship between the dome cover and the lens affects image quality.

SUMMARY

This disclosure has been made taking the foregoing circumstances into consideration, and provides a imaging device which realizes high image quality by increasing the positional accuracy of a dome cover and a lens.

A imaging device of this disclosure includes a case, a dome cover, an annular support member, a lens unit which includes a lens, and an elastic member. The case includes a bottom plate portion and a top plate portion with an accommodation space interposed therebetween. The dome cover protrudes outward from the case through an opening formed in the top plate portion of the case. The support member allows a circumferential edge portion of the dome cover to be interposed between the support member and the top plate portion. The elastic member is disposed between the bottom plate portion of the case and the lens unit and allows the lens unit to be biased in a direction approaching the dome cover. The lens unit includes an outer circumferential portion and a stepped portion. The outer circumferential portion is disposed on outside of the lens in a direction along the bottom plate portion of the case and is engaged with an inside opening of the support member. The stepped portion is provided in the outer circumferential portion and restricts movement in the direction approaching the dome cover by abutting the support member.

According to this disclosure, high image quality can be realized by increasing the positional accuracy of the dome cover and the lens.

BRIEF DESCRIPTION OF DRAWINGS

FIG. 2 is an exploded perspective view illustrating an example of the imaging device in the exemplary embodiment;

FIG. 6A is an exploded perspective view illustrating an example of the lens unit and the lens holder in the exemplary embodiment, and FIG. 6B is a sectional view illustrating an example of the lens holder and the lens unit in an assembled state in the exemplary embodiment;

DETAILED DESCRIPTION OF THE PREFERRED EMBODIMENT

Hereinafter, an exemplary embodiment of this disclosure will be described with reference to the drawings.

Figure 1:
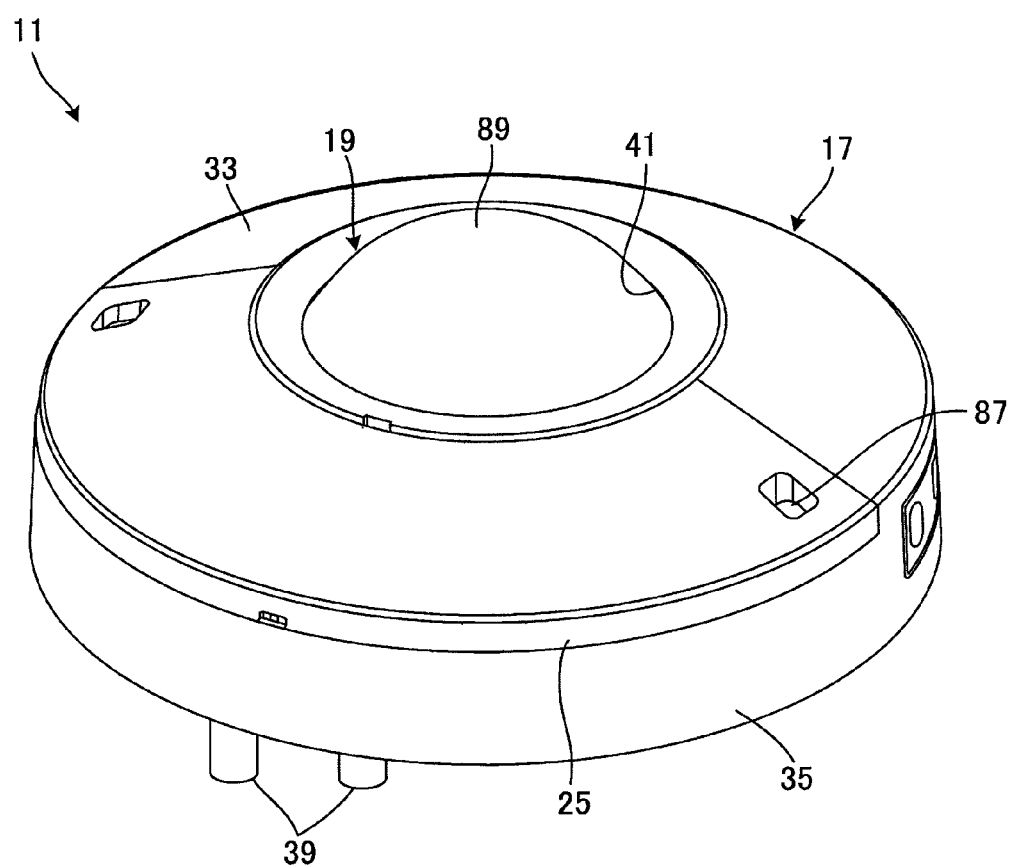
FIG. 1 is a perspective view illustrating an example of a imaging device viewed from a dome cover side in an exemplary embodiment.
Figure 3:
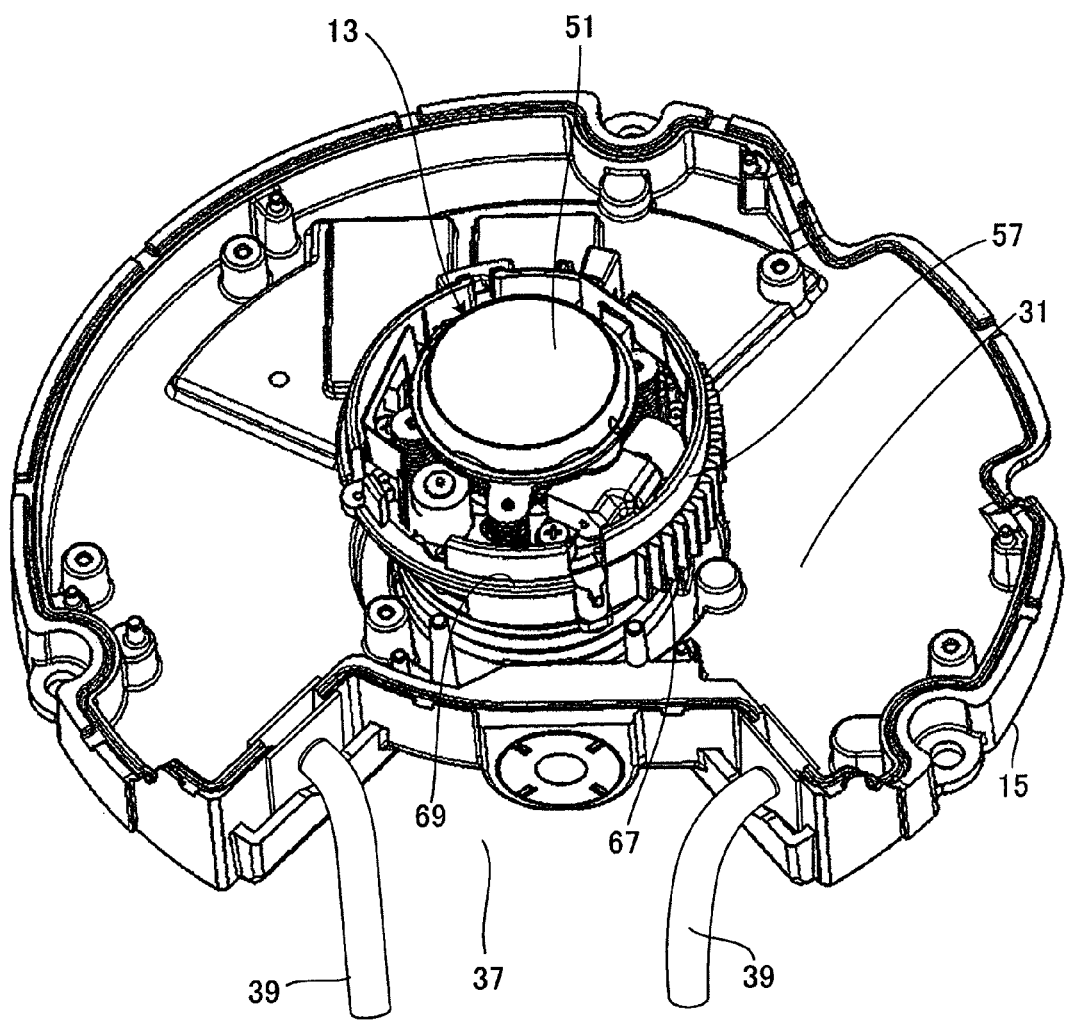
FIG. 3 is a perspective view illustrating an example of a lower case on which a lens unit is mounted in the exemplary embodiment.

FIG. 1 is a perspective view illustrating an example of a imaging device viewed from a dome cover side in an exemplary embodiment. FIG. 2 is an exploded perspective view illustrating an example of imaging device 11. FIG. 3 is a perspective view illustrating an example of lower case 15 on which lens unit 13 is mounted.

Imaging device 11 is, for example, mounted on the ceiling or wall as a monitoring camera device. Imaging device 11 has a positioning structure and an adjusting gear structure. The positioning structure includes case 17, dome cover 19, dome bracket 21 (see FIG. 7) (an example of a support member), lens unit 13, and lens holding spring 23 (see FIG. 4C) (an example of an elastic member). The adjusting gear structure includes case 17, lens unit 13, sub-cover 25, and adjusting gear unit 27.

Case 17 includes bottom plate portion 31 and top plate portion 33 with accommodation space 29 interposed therebetween. Case 17 includes lower case 15 (an example of a first case) having bottom plate portion 31 and upper case 35 (an example of a second case) having top plate portion 33. Lower case 15 and upper case 35 are joined to each other.

Lower case 15 is formed, for example, in a cylindrical shape with a flat bottom. Electric wire lead-out space 37 is provided as a cut-out from a portion of lower case 15 in the circumferential direction thereof. Connection electric wire 39 is disposed in electric wire lead-out space 37. Lens unit 13 is mounted in the center portion of lower case 15. In addition, in lower case 15, for example, various electronic components (not illustrated) and a board (not illustrated) having the electronic components mounted thereon and having a shape that surrounds lens unit 13 are mounted.

Connection electric wire 39 supplies power, for example, to electronic components in imaging device 11 such as lens unit 13 and transmit various signals from the electronic components in imaging device 11 such as lens unit 13. Connection electric wire 39 is disposed so that a portion thereof extends to the inside of lower case 15 (not illustrated).

Upper case 35 is formed, for example, in a flat cylindrical shape in which the apex of a conical portion has opening 41. Upper case 35 is mounted coaxially with lower case 15 to cover lower case 15. Dome cover 19 which protrudes outward from case 17 through opening 41 formed in top plate portion 33 is mounted on upper case 35.

Figure 4A:
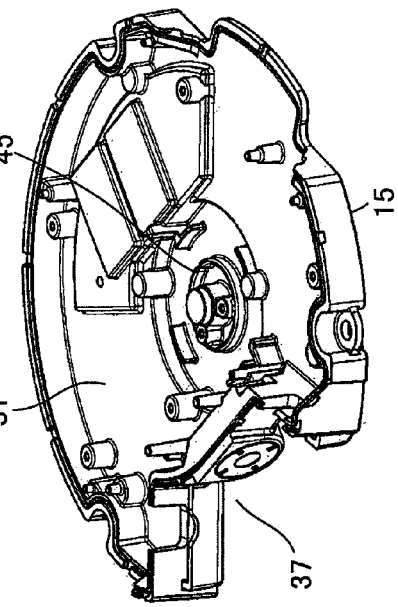
FIG. 4A is a perspective view illustrating an example of the lower case in the exemplary embodiment.
Figure 4C:
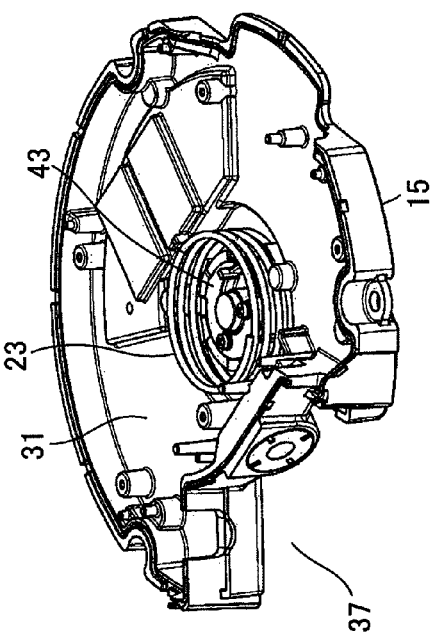
FIG. 4C is a perspective view illustrating an example of the lower case on which a lens holding spring is mounted in the exemplary embodiment.
Figure 4B:
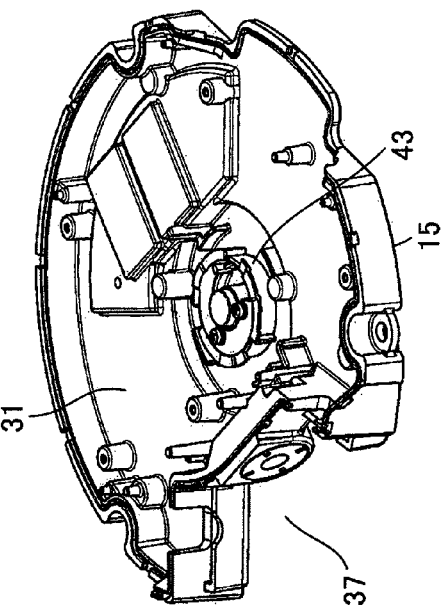
FIG. 4B is a perspective view illustrating an example of the lower case on which a lens holder is mounted in the exemplary embodiment.
Figure 4D:
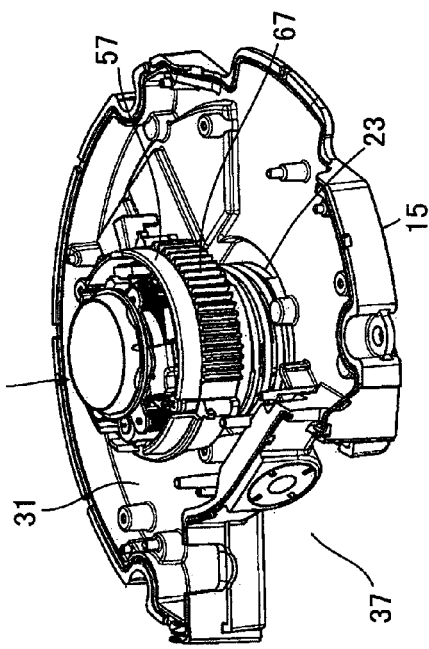
FIG. 4D is a perspective view illustrating an example of the lower case on which the lens unit is mounted in the exemplary embodiment.

FIGS. 4A to 4D are perspective views illustrating an example of a process in which various components of lower case 15 are mounted. The components are mounted in order of FIGS. 4A, 4B, 4C, and 4D. FIG. 4A is a perspective view illustrating an example of lower case 15. FIG. 4B is a perspective view illustrating an example of lower case 15 on which lens holder 43 is mounted. FIG. 4C is a perspective view illustrating an example of lower case 15 on which lens holding spring 23 is mounted. FIG. 4D is a perspective view illustrating an example of lower case 15 on which lens unit 13 is mounted.

Figure 5:
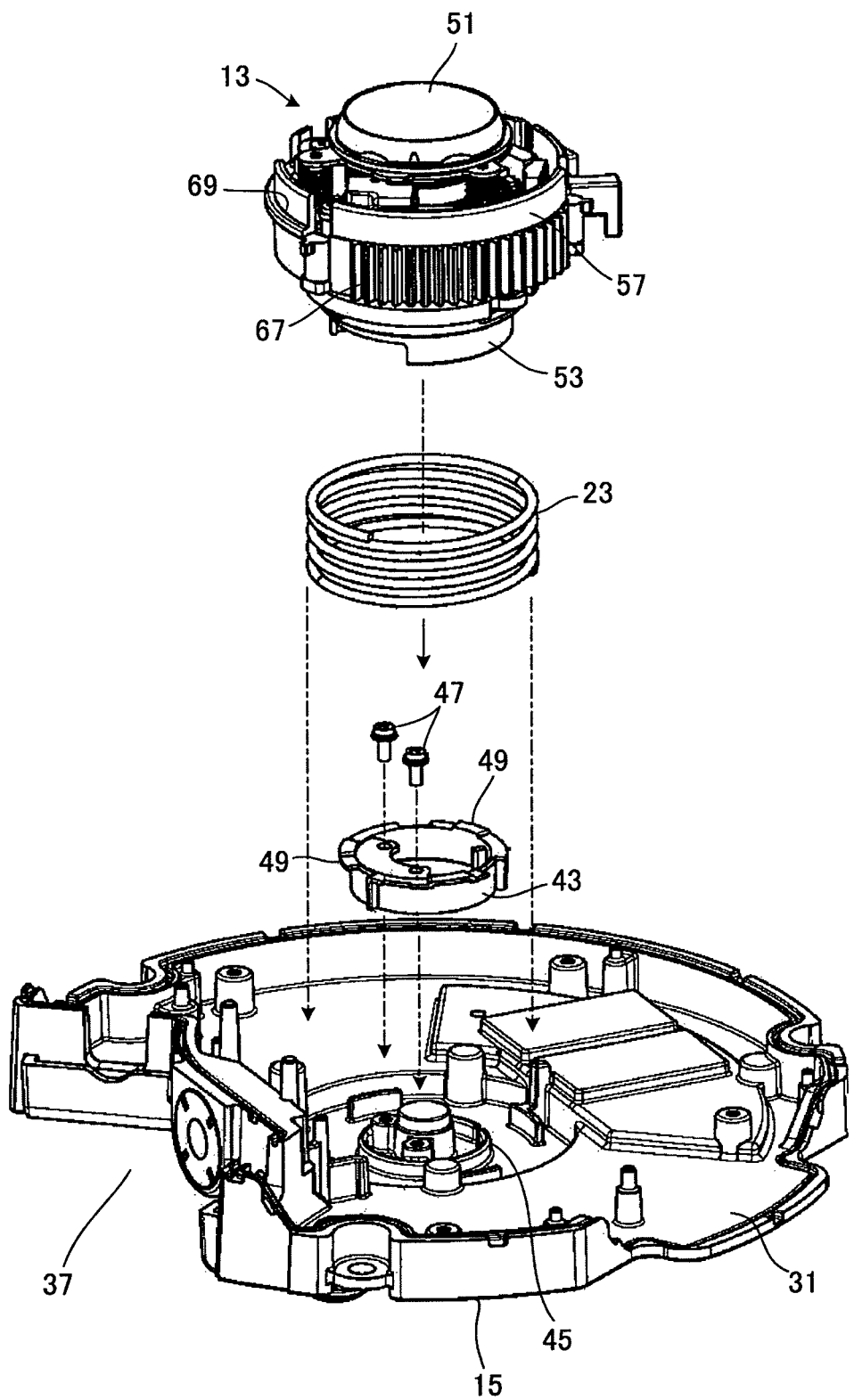
FIG. 5 is an exploded perspective view illustrating an example of a lens unit holding structure in the exemplary embodiment.

FIG. 5 is an exploded perspective view illustrating an example of a lens unit holding structure. FIG. 6A is a perspective view illustrating an example of a state in which lens unit 13 and lens holder 43 are disassembled from each other. FIG. 6B is a sectional view illustrating an example of a state in which lens holder 43 and lens unit 13 are assembled to each other.

In imaging device 11, lens holder 43 is fixed to top plate portion 31. Lens unit 13 is held to be movable in a direction approaching and away from dome cover 19 by lens holder 43 and lens holding spring 23. As illustrated in FIG. 4A, lens holder mounting portion 45 is formed at the center portion of lower case 15.

As illustrated in FIG. 4B, lens holder 43 is fixed to lens holder mounting portion 45 by holder fixing screw 47 illustrated in FIG. 5. Lens holder 43 is formed, for example, in a cylindrical shape. A plurality of locking flange portions 49 which protrude outward in the radial direction are provided in the upper end portion of lens holder 43 in the circumferential direction thereof. As illustrated in FIG. 4C, lens holding spring 23 is disposed on the outside of lens holder 43.

As illustrated in FIGS. 6A and 6B, lens unit 13 has, for example, cylindrical fixing base portion 53 in the bottom portion on the opposite side of lens 51. A plurality of inside locking pieces 55 (an example of an engagement member) which protrude inward in the radial direction are provided in the lower end (the end on the bottom plate portion 31 side) of fixing base portion 53 in the circumferential direction thereof.

Fitting outer diameter portion 57 which has a constant radius from its axis is formed in the outer periphery of lens unit 13. Spring seat 59 having a smaller diameter than that of fitting outer diameter portion 57 is formed in the outer periphery of lens unit 13 on the opposite side of lens 51. One end side of lens holding spring 23 abuts spring seat 59. The other end side of lens holding spring 23 of which one end side abuts spring seat 59 abuts lens holder mounting portion 45.

As illustrated in FIG. 4D, as lens unit 13 presses lens holding spring 23 from above, the outside of lens holder 43 is inserted into fixing base portion 53. When fixing base portion 53 rotates about its axis, inside locking pieces 55 are locked to recess portions 61 (an example of an engagement portion) of locking flange portions 49 illustrated in FIG. 6A. Accordingly, lens unit 13 is in a state of being held in lens holder 43 even by the biasing force of lens holding spring 23 without being separated from lens holder 43.

In this state, that is, in the state in which lens unit 13 is held in lens holder 43, when lens unit 13 is pressed against the lens holder side, lens unit 13 can retreat while compressing lens holding spring 23. The retreat distance becomes, for example, stroke S illustrated in FIG. 6B to absorb an impact on lens unit 13.

As described above, lens holding spring 23 is disposed between bottom plate portion 31 and lens unit 13 and allows lens unit 13 to be biased in a direction approaching dome cover 19. Since lens unit 13 is locked to recess portions 61 of locking flange portions 49 with the biasing force, the position of lens unit 13 is fixed on the bottom plate portion 31 side of lower case 15 during the assembly of upper case 35 and lower case 15, resulting in the facilitation of the assembly. Lens holding spring 23 is, for example, a coil spring disposed coaxially with lens unit 13.

Lens unit 13 includes stepped portion 69 illustrated in FIG. 6B on the lens 51 side of fitting outer diameter portion 57. Stepped portion 69 abuts the circumferential edge of inside opening 65 of dome bracket 21 (see FIG. 13).

When upper case 35 is assembled to lower case 15, dome bracket 21 abuts stepped portion 69 of lens unit 13 to restrict the movement of lens unit 13 in a direction approaching dome cover 19, and presses lens unit 13 against the restoring force of lens holding spring 23. Inside locking pieces 55 of fixing base portion 53 are pressed, and locking thereof to recess portions 61 of locking flange portions 49 is released. When locking to recess portions 61 of locking flange portions 49 is released, lens unit 13 is able to rotate around locking flange portions 49.

Lens unit 13 includes capturing element 63, is disposed in accommodation space 29, and is rotatable about its optical axis. Fitting outer diameter portion 57 is rotatably fitted into inside opening 65 of dome bracket 21 (see FIG. 13). Segment gear 67 which has a larger outside diameter than that of fitting outer diameter portion 57 is formed in the outer circumferential portion of lens unit 13. Segment gear 67 meshes with adjusting gear unit 27 (see FIG. 9A), which will be described later.

As fitting outer diameter portion 57 is fitted into inside opening 65 of dome bracket 21, the position of lens unit 13 is determined to have the same axis as that of dome cover 19. In a state in which stepped portion 69 abuts dome bracket 21, segment gear 67 is disposed in accommodation space 29.

In lens unit 13, lens fixing member 71 (see FIG. 13) which holds lens 51 is, for example, mounted to be movable with respect to unit body 75 via floating mount 73. Floating mount 73 allows lens fixing member 71 to be biased in a direction to float on unit body 75 by floating spring 77. Lens unit 13 includes, for example, a fisheye lens as lens 51 and thus functions as an omnidirectional camera. Therefore, even in a case where imaging device 11 captures images in all directions (360 degrees), panning and tilting are unnecessary.

Figure 7:
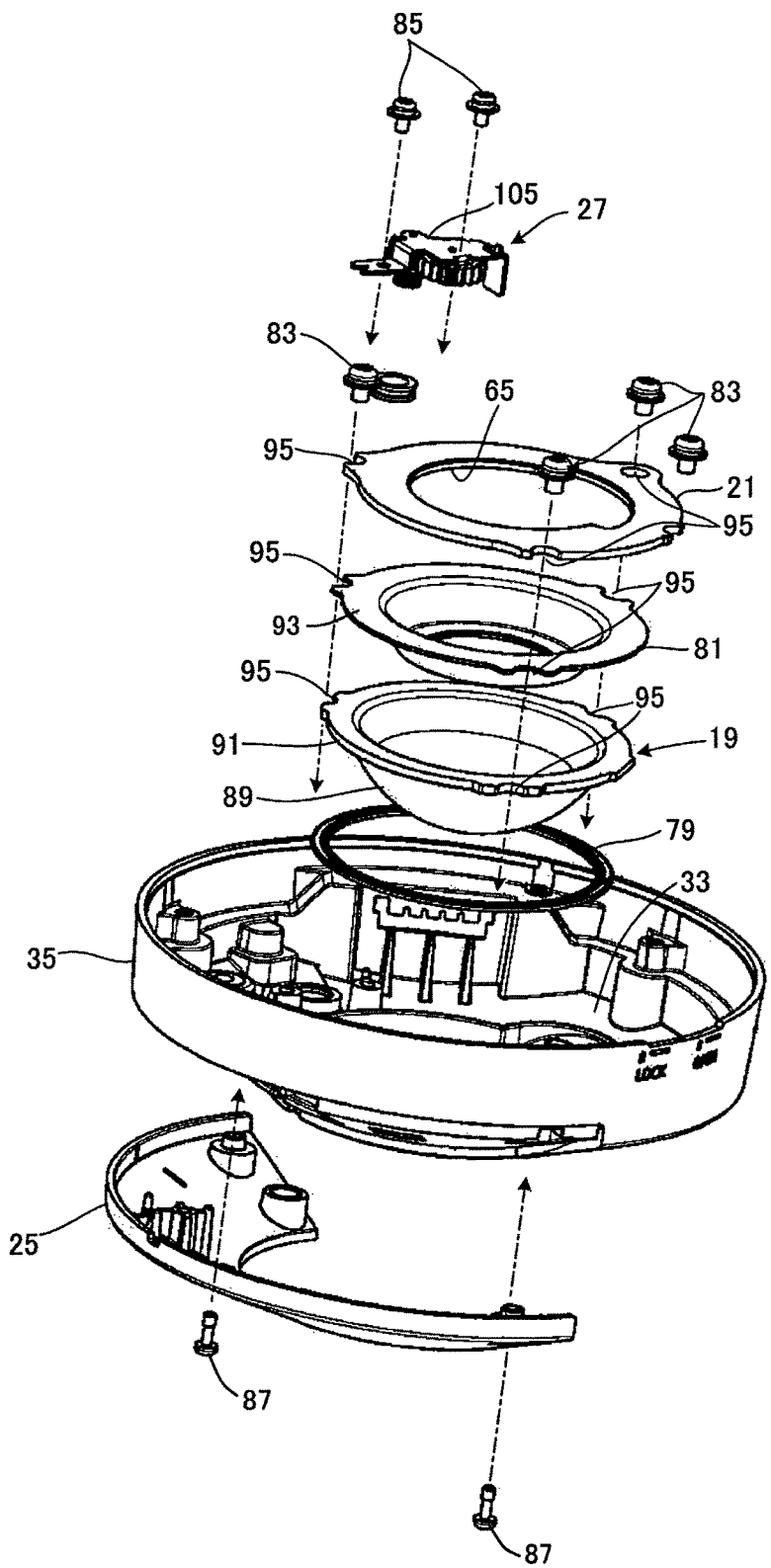
FIG. 7 is an exploded perspective view illustrating an example of an upper case in the exemplary embodiment.

FIG. 7 is an exploded perspective view illustrating an example of upper case 35.

In upper case 35, dome packing 79, dome cover 19, inner dome 81, and dome bracket 21 are mounted by dome cover fixing screws 83. Adjusting gear unit 27 is mounted on the accommodation space 29 side of upper case 35 by adjusting gear fixing screws 85. Sub-cover 25 is detachably mounted to a portion of the outside of upper case 35 by sub-cover fixing screws 87.

Dome cover 19 includes, for example, hemispherical dome portion 89, and dome cover flange portion 91 which protrudes outward in the radial direction from the circumferential edge of the opening side of dome portion 89. Dome cover 19 is formed as a portion of lens 51, and the optical path thereof is designed to be integrated with that of lens 51. Specifically, the ratio (Tmax−Tmin)/r of the difference (Tmax−Tmin) between the maximum thickness Tmax and the minimum thickness Tmin of dome cover 19 to the radius r of dome cover 19 is 0.75% or higher and 6% or lower. Dome cover 19 is formed of, for example, polycarbonate (PC). Dome cover 19 may use, for example, refraction of light through uneven thickness in the relationship between dome cover 19 and lens 51 (see FIG. 5) to enhance the quality of a captured image.

Inner dome 81 includes annular inner dome flange portion 93. Dome bracket 21 is formed as an annular plate which overlaps dome cover flange portion 91 and inner dome flange portion 93 to be pressed and fixed. In the outer circumferential edges of dome cover flange portion 91, inner dome flange portion 93, and dome bracket 21, a plurality of (for example, four) screw insertion portions 95 through which dome cover fixing screws 83 pass are formed in the circumferential direction.

FIGS. 8A to 8F are perspective views illustrating an example of a process in which various components of upper case 35 are mounted. The components are mounted in order of FIGS. 8A, 8B, 8C, 8D, 8E, and 8F.

Figure 8E:
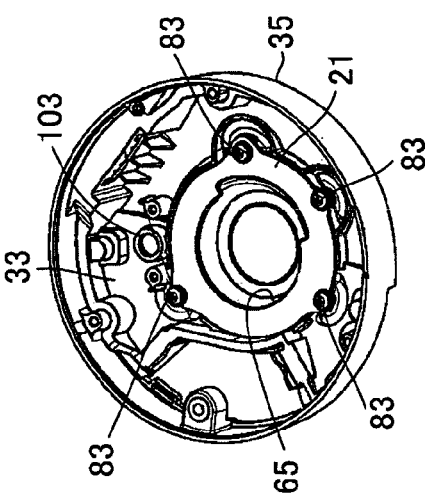
FIG. 8E is a perspective view illustrating an example of the upper case on which a dome bracket is mounted in the exemplary embodiment.
Figure 8F:
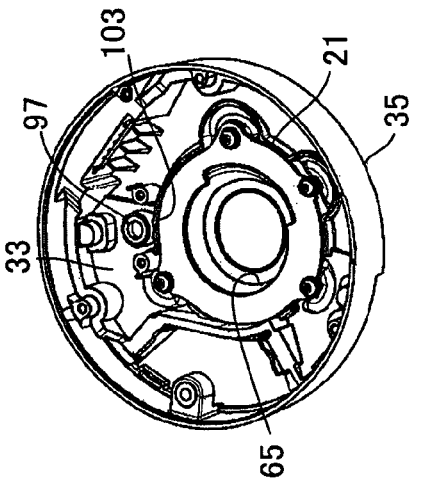
FIG. 8F is a perspective view illustrating an example of the upper case on which a sub-cover packing is mounted in the exemplary embodiment.
Figure 8C:
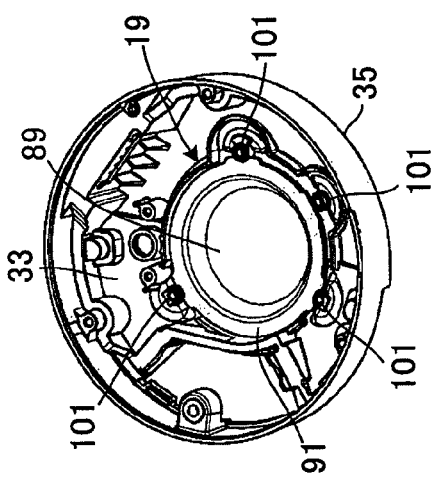
FIG. 8C is a perspective view illustrating an example of the upper case on which a dome cover is mounted in the exemplary embodiment.
Figure 8D:
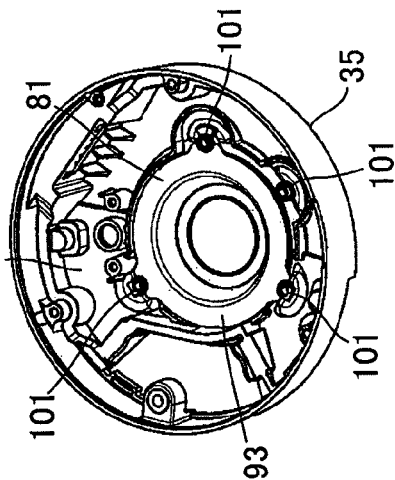
FIG. 8D is a perspective view illustrating an example of the upper case on which an inner dome is mounted in the exemplary embodiment.
Figure 8A:
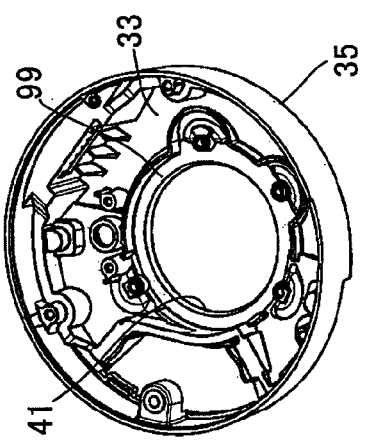
FIG. 8A is a perspective view illustrating an example of the upper case in the exemplary embodiment.
Figure 8B:
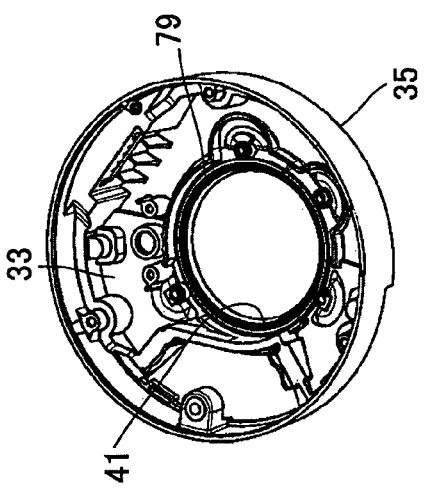
FIG. 8B is a perspective view illustrating an example of the upper case on which a dome packing is mounted in the exemplary embodiment.

FIG. 8A is a perspective view illustrating an example of upper case 35. FIG. 8B is a perspective view illustrating an example of upper case 35 on which dome packing 79 is mounted. FIG. 8C is a perspective view illustrating an example of upper case 35 on which dome cover 19 is mounted. FIG. 8D is a perspective view illustrating an example of upper case 35 on which inner dome 81 is mounted. FIG. 8E is a perspective view illustrating an example of upper case 35 on which dome bracket 21 is mounted. FIG. 8F is a perspective view illustrating an example of upper case 35 on which sub-cover packing 97 is mounted.

The assembly of upper case 35 is performed, for example, by disposing upper case 35 so that accommodation space 29 is positioned on the upper side as illustrated in FIG. 8A. As illustrated in FIG. 8B, dome packing 79 is disposed on packing seating surface 99 provided in the circumferential edge of opening 41 of upper case 35.

As illustrated in FIG. 8C, dome portion 89 of dome cover 19 is inserted into opening 41 around which dome packing 79 is disposed. Dome cover 19 is disposed so that screw insertion portions 95 of dome cover flange portion 91 are aligned with screw fixing portions 101 of upper case 35. Dome cover flange portion 91 of dome cover 19 abuts dome packing 79. Accordingly, a gap between opening 41 and dome cover flange portion 91 is air-tightly sealed by dome packing 79.

As illustrated in FIG. 8D, inner dome 81 is disposed on the inside of dome cover 19. Screw insertion portions 95 of inner dome flange portion 93 in inner dome 81 are disposed to be aligned with screw fixing portions 101.

As illustrated in FIG. 8E, dome bracket 21 is disposed to overlap inner dome flange portion 93. Dome cover fixing screws 83 inserted through screw insertion portions 95 of dome bracket 21 are fixed to screw fixing portions 101 of upper case 35. Dome bracket 21 allows the circumferential edge portion (dome cover flange portion 91) of dome cover 19 to be interposed between inner dome 81 and top plate portion 33. Accordingly, in the circumferential edge of opening 41 of upper case 35, dome packing 79, inner dome 81, and dome bracket 21 are fixed in a stacked state.

As illustrated in FIG. 8F, sub-cover packing 97 is mounted on adjusting gear penetration portion 103 (an example of a penetration hole) of upper case 35.

As described above, in imaging device 11, dome cover 19, dome bracket 21, and the like are provided in upper case 35 while lens unit 13, lens holding spring 23, and the like are provided in lower case 15. After each of upper case 35 and lower case 15 is assembled in advance (pre-assembled), upper case 35 and lower case 15 are finally assembled into one body as imaging device 11. Therefore, upper case 35 and lower case 15 can be easily assembled.

Next, adjusting gear unit 27 will be described.

Figure 9A:
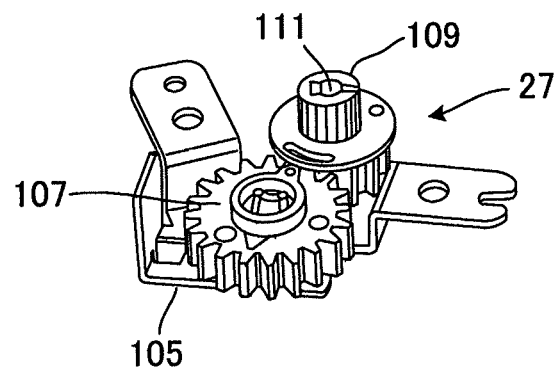
FIG. 9A is a perspective view illustrating an example of an adjusting gear unit in the exemplary embodiment.
Figure 9B:
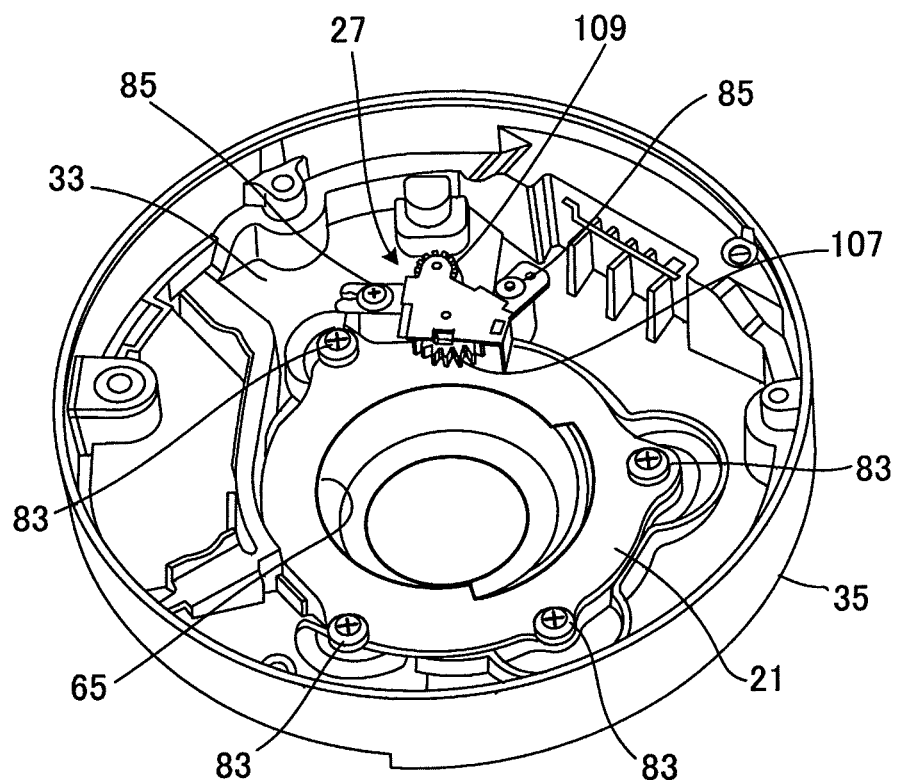
FIG. 9B is a perspective view illustrating an example of the upper case on which the adjusting gear unit is mounted in the exemplary embodiment.
Figure 10:
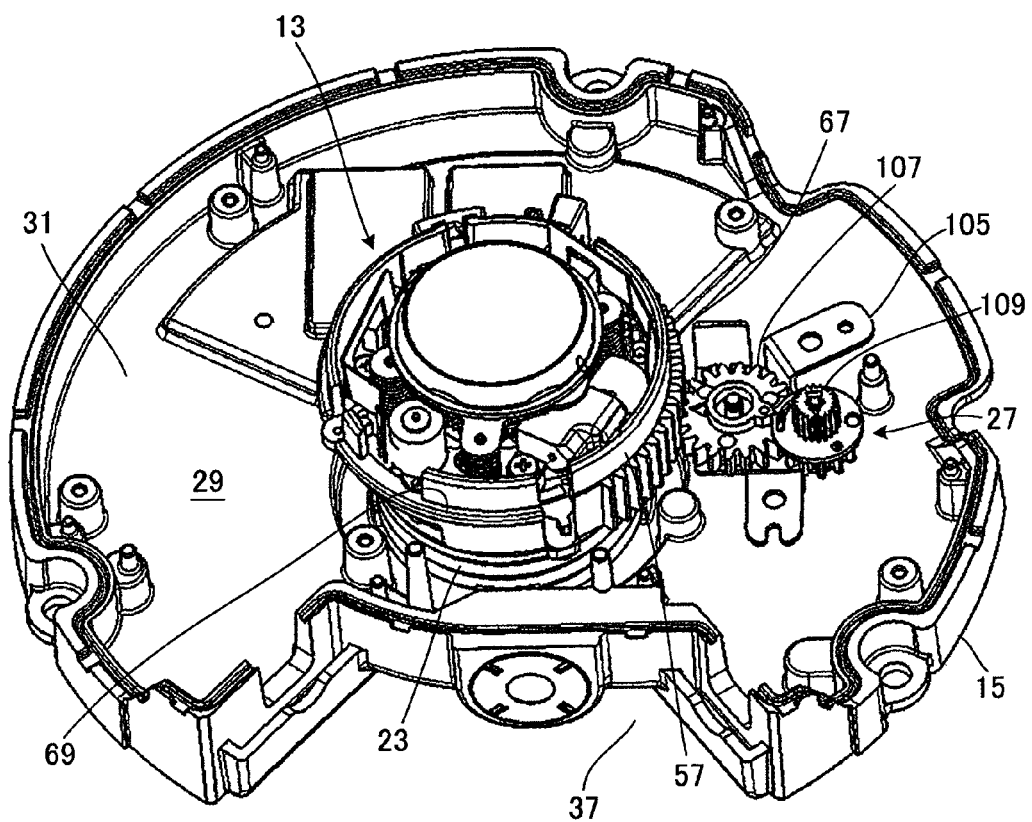
FIG. 10 is a perspective view illustrating an example of a state in which the lens unit and the adjusting gear unit mesh with each other in the exemplary embodiment.

FIG. 9A is a perspective view illustrating an example of adjusting gear unit 27. FIG. 9B is a perspective view illustrating an example of upper case 35 on which adjusting gear unit 27 is mounted. FIG. 10 is a perspective view illustrating an example of a state in which lens unit 13 and adjusting gear unit 27 mesh with each other.

Adjusting gear unit 27 is fixed to upper case 35 by adjusting gear fixing screws 85. Adjusting gear unit 27 can be assembled to adjusting gear holder 105 in a state in which intermediate gear 107 and adjusting gear 109 mesh with each other. Substantially the half of adjusting gear 109 in the axial direction thereof meshes with intermediate gear 107. That is, a portion of adjusting gear 109 which does not mesh with intermediate gear 107 protrudes in a direction in which the portion floats from intermediate gear 107. The protruding portion of adjusting gear 109 is exposed to the outside of upper case 35 from adjusting gear penetration portion 103. Adjusting gear 109 is formed coaxially with jig insertion hole 111. As a jig is inserted into jig insertion hole 111 and is rotated, adjusting gear 109 can be rotated from the outside of upper case 35.

As upper case 35 and lower case 15 are assembled to each other, as illustrated in FIG. 10, in adjusting gear unit 27, intermediate gear 107 meshes with segment gear 67 of lens unit 13 mounted on lower case 15. Therefore, in imaging device 11, as adjusting gear 109 is rotated from the outside of upper case 35, lens unit 13 can be rotated.

Adjusting gear 109 can be rotated, for example, by a predetermined angle (for example, 45 degrees) from a reference position. Accordingly, for example, an image rotation in a range of 90 degrees is possible. In addition, the number of teeth of adjusting gear unit 27 is determined, for example, by a resolution per tooth.

Figure 14A:
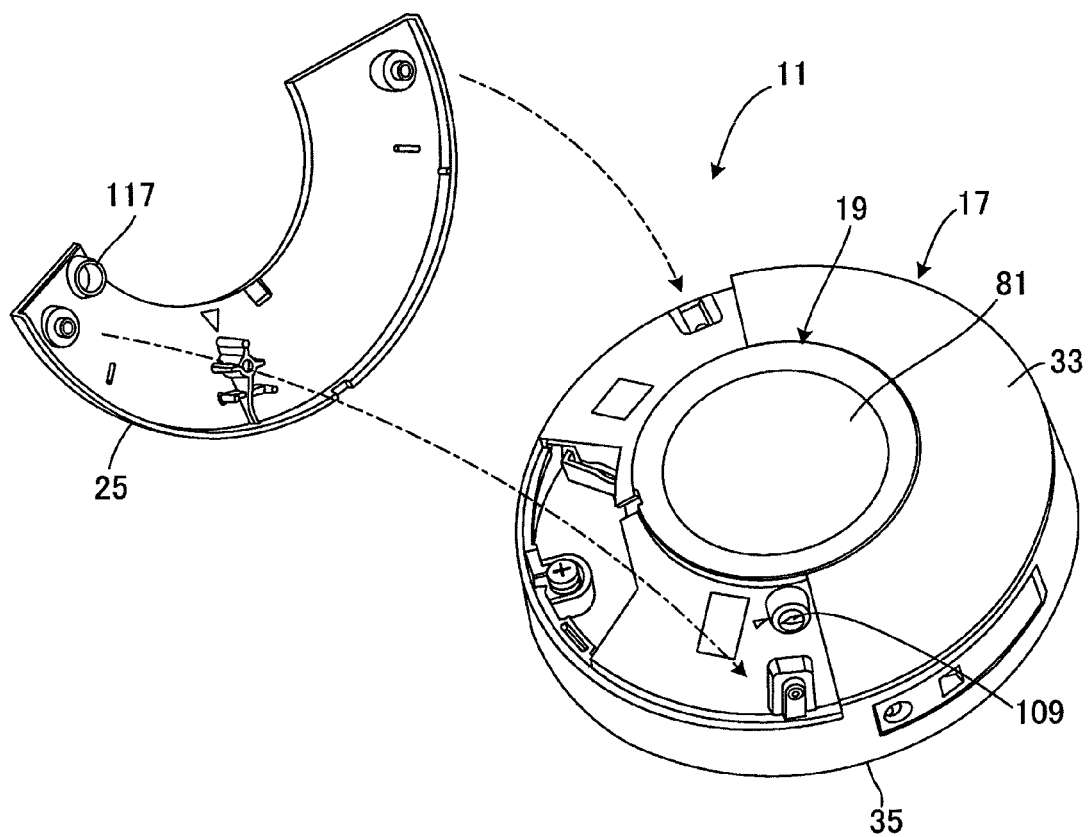
FIG. 14A is a perspective view illustrating an example of the imaging device from which a sub-cover is detached in the exemplary embodiment.
Figure 14B:
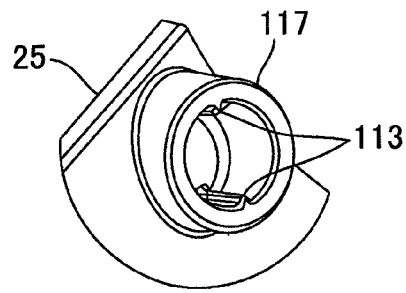
FIG. 14B is an enlarged view illustrating an example of the vicinity of a blocking portion provided in the sub-cover in the exemplary embodiment.
Figure 15B:
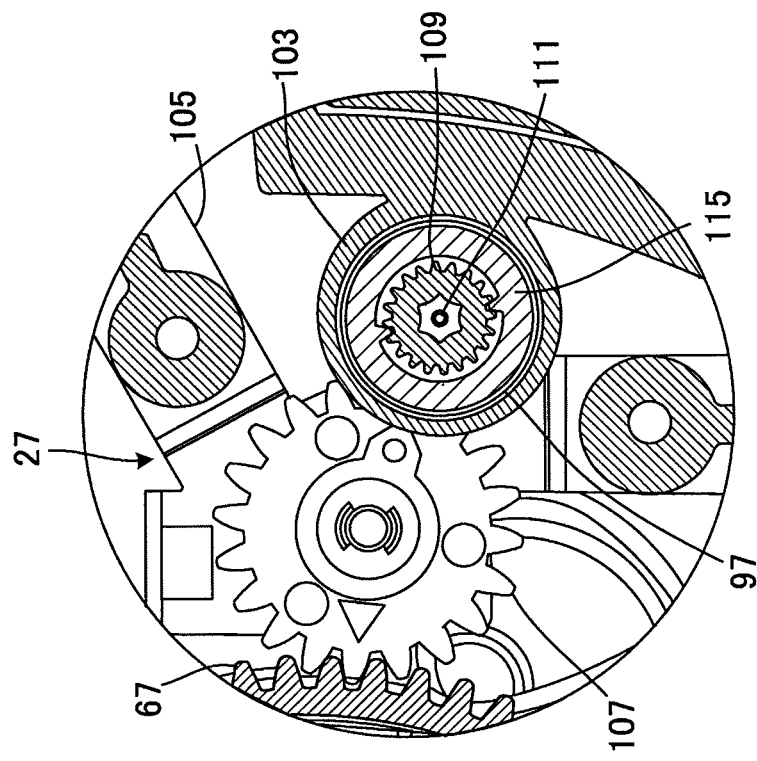
FIG. 15B is an enlarged view illustrating main parts of the vicinity of an adjusting gear illustrated in FIG. 15A.
Figure 15A:
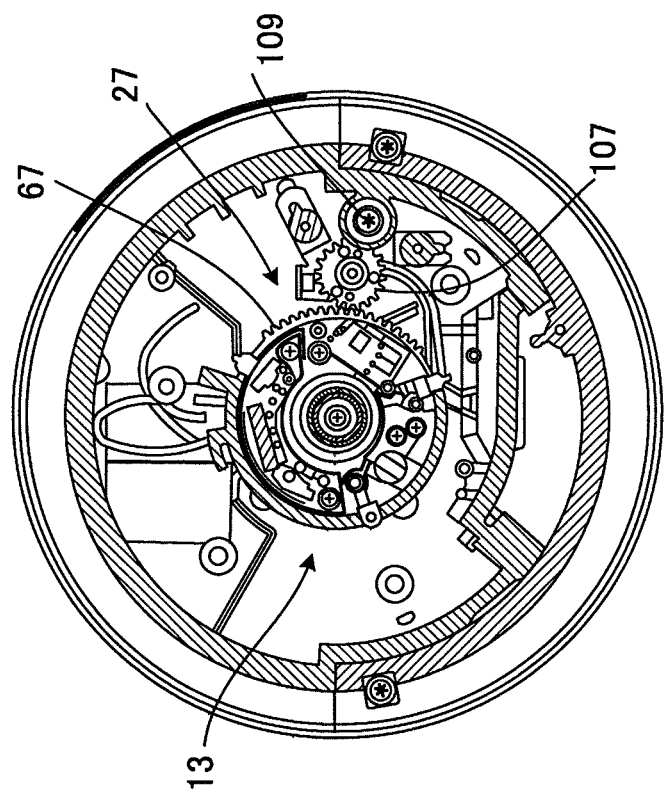
FIG. 15A is a plan view illustrating an example of a rotation structure of the lens unit of the imaging device in the exemplary embodiment.
Figure 16:
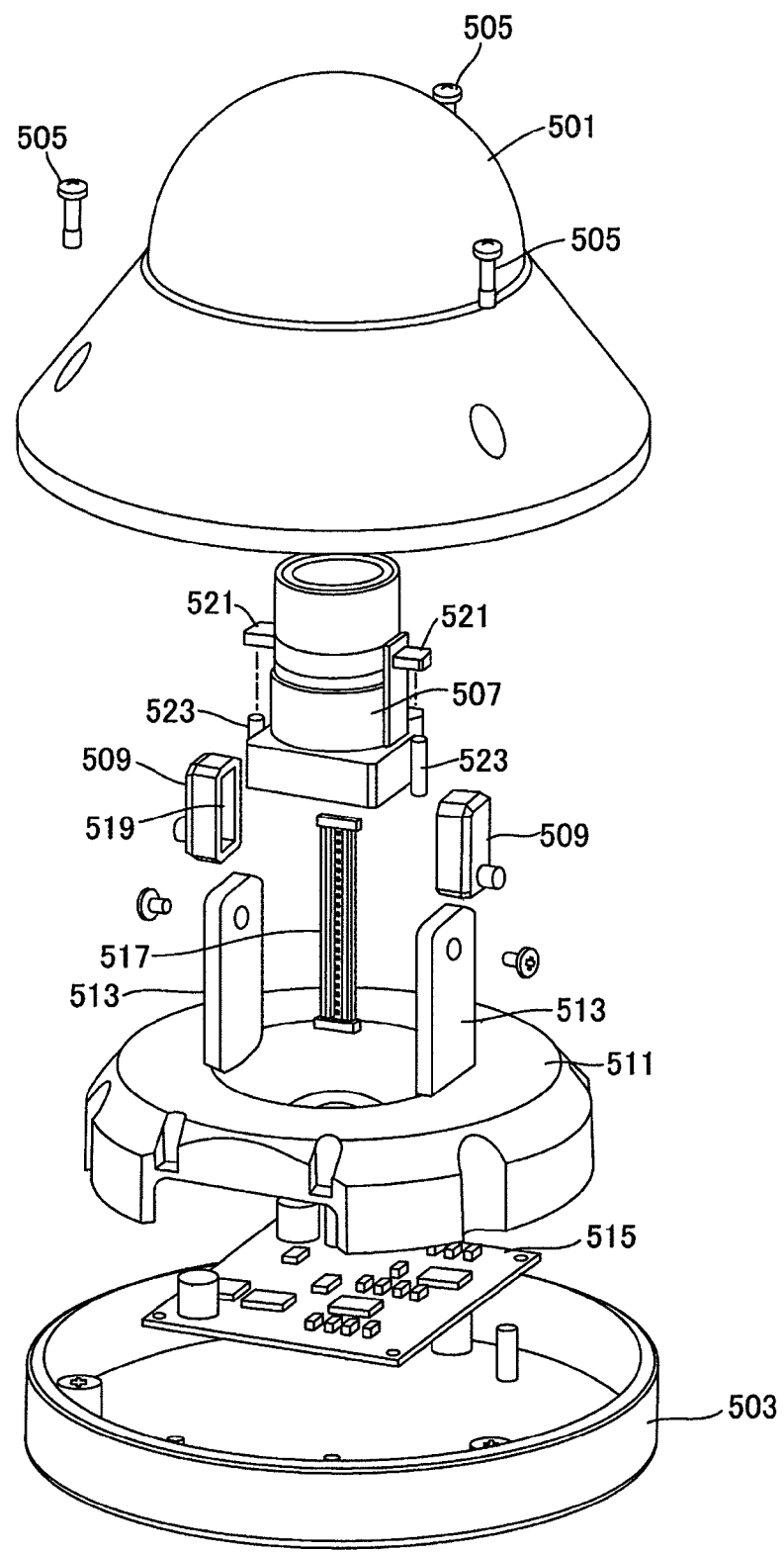
FIG. 16 is an exploded perspective view illustrating a imaging device according to the related art.

FIG. 14A is a perspective view illustrating an example of a state in which sub-cover 25 is detached from imaging device 11. FIG. 14B is an enlarged view illustrating an example of the vicinity of blocking portion 117 provided in sub-cover 25. FIG. 15A is a plan view illustrating an example of a rotation structure of lens unit 13 of imaging device 11. FIG. 15B is an enlarged view illustrating an example of the vicinity of adjusting gear 109 of FIG. 15A.

Adjusting gear 109 is exposed to the outside from adjusting gear penetration portion 103 of upper case 35. Sub-cover 25 is fixed to upper case 35. As sub-cover 25 (an example of a cover) is mounted on upper case 35, sub-cover 25 covers adjusting gear 109 of adjusting gear penetration portion 103 (see FIG. 1).

Sub-cover 25 has protrusions 113. Protrusions 113 mesh with adjusting gear 109 to restrict the rotation of adjusting gear 109. Protrusions 113 are formed, for example, in a shape of a pair of protrusions. Protrusions 113 are formed on the inside of blocking portion 117. In FIG. 14B, the number of protrusions 113 is two, and may also be three or more.

Annular sub-cover packing 97 (an example of a cover packing) in which adjusting gear 109 is accommodated is mounted in adjusting gear penetration portion 103 of upper case 35 on the inside of adjusting gear penetration portion 103.

In sub-cover 25, cylindrical blocking portion 117 which presses annular end surface 115 of sub-cover packing 97 and air-tightly surrounds adjusting gear 109 is formed. Accordingly, when sub-cover 25 is mounted on upper case 35, a gap between blocking portion 117 of sub-cover 25 and adjusting gear penetration portion 103 is air-tightly sealed by sub-cover packing 97.

Next, the action of imaging device 11 will be described.

Figure 11A:
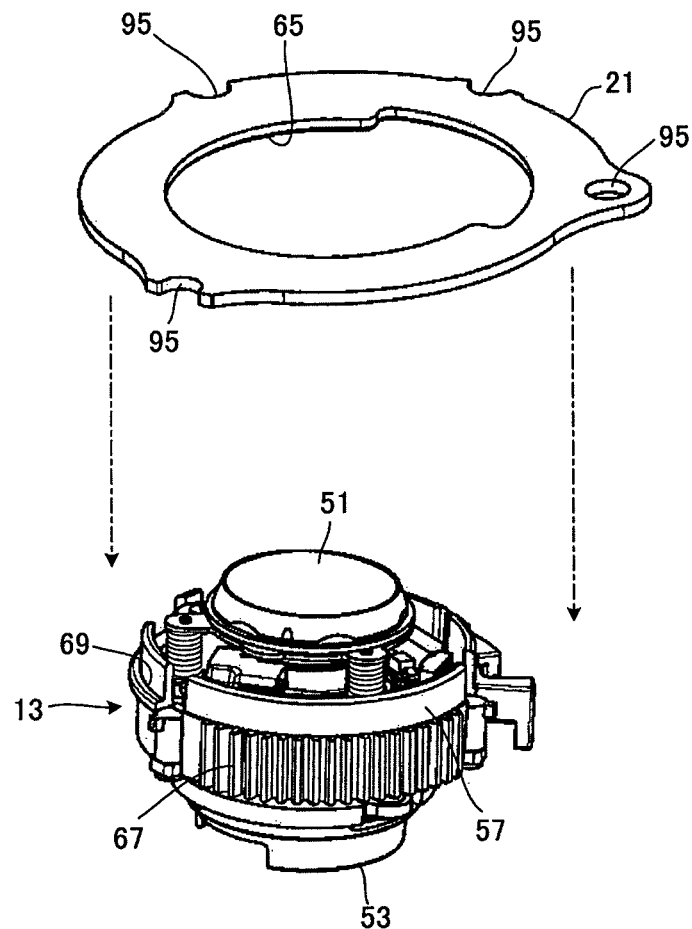
FIG. 11A is an exploded perspective view illustrating an example of the dome bracket and the lens unit in the exemplary embodiment.
Figure 11B:
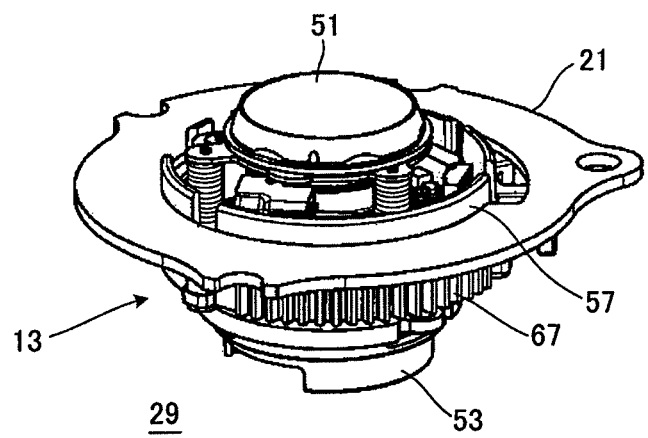
FIG. 11B is a perspective view illustrating an example of the lens unit in a state of abutting the dome bracket in the exemplary embodiment.
Figure 12A:
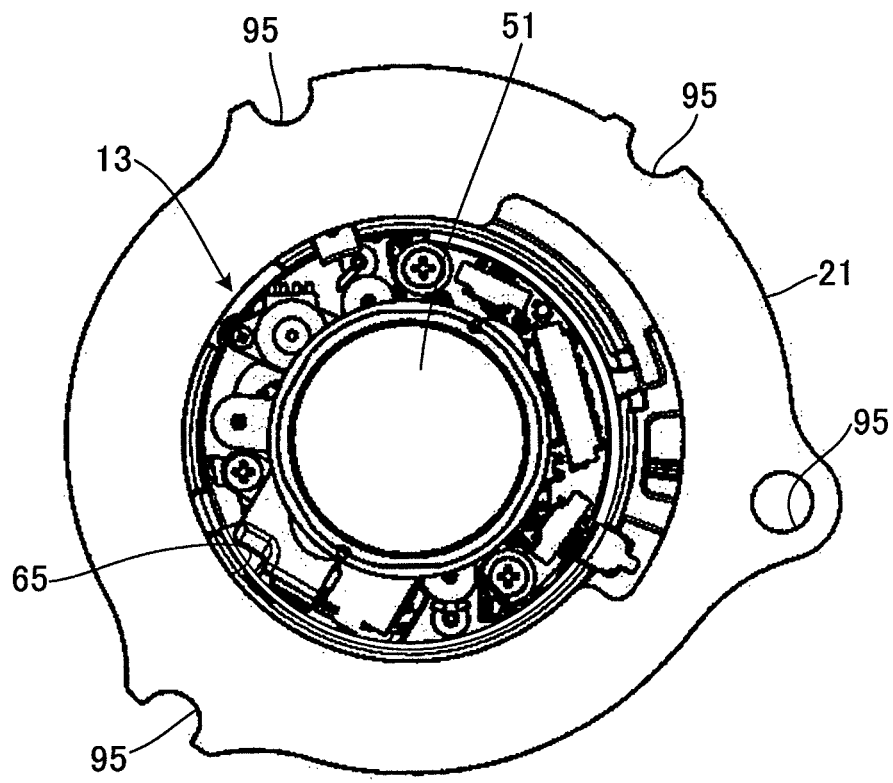
FIG. 12A is a plan view illustrating an example of the dome bracket abutted by the lens unit in the exemplary embodiment.
Figure 12B:
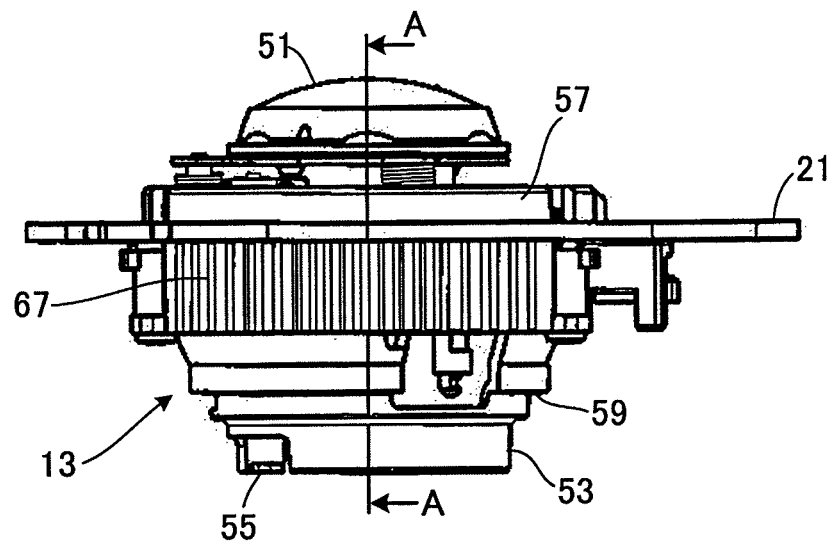
FIG. 12B is a side view of FIG. 12A.
Figure 13:
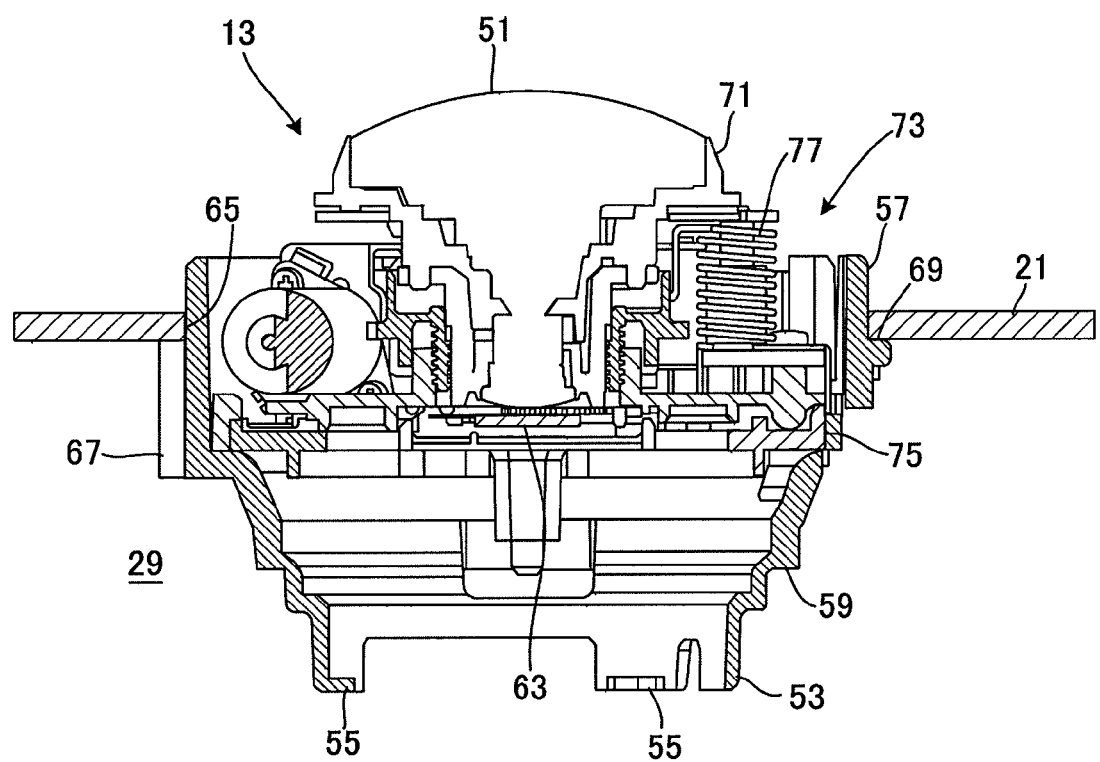
FIG. 13 is a sectional view taken along line 13-13 of FIG. 12B.

FIG. 11A is a perspective view illustrating an example of a state in which dome bracket 21 and lens unit 13 are disassembled from each other. FIG. 11B is a perspective view illustrating an example of a state in which lens unit 13 abuts dome bracket 21. FIG. 12A is a plan view illustrating an example of dome bracket 21 abutted by lens unit 13. FIG. 12B is a side view of FIG. 12A. FIG. 13 is a sectional view taken along line 13-13 of FIG. 12B.

In imaging device 11, as illustrated in FIG. 1, dome cover 19 protrudes outward from case 17 through opening 41 of case 17. The circumferential edge portion (dome cover flange portion 91) of dome cover 19 is interposed between top plate portion 33 and dome bracket 21. As illustrated in FIGS. 11A and 11B, (fitting outer diameter portion 57) of lens unit 13 is fitted into inside opening 65 of dome bracket 21 formed in an annular shape. Accordingly, as illustrated in FIG. 12B, the position of lens unit 13 is determined to have the same axis as that of dome bracket 21.

As illustrated in FIG. 13, as stepped portion 69 formed in the outer circumferential portion of lens unit 13 abuts dome bracket 21, the movement of lens unit 13 in a direction approaching dome cover 19 (a direction along the optical axis) is restricted. Lens unit 13 is biased in a direction approaching dome cover 19 by lens holding spring 23 (see FIG. 10) provided between lens unit 13 and bottom plate portion 31. That is, lens unit 13 is pressed against top plate portion 33 side from bottom plate portion 31 by lens holding spring 23 such that the position thereof is determined. Therefore, stepped portion 69 is in a state of abutting dome bracket 21. Accordingly, a tilt of lens unit 13 relative to dome bracket 21 is restricted.

Lens unit 13 is rotatable relative to opening 41 in a state in which stepped portion 69 abuts dome bracket 21.

Dome bracket 21 is disposed substantially in parallel to bottom plate portion 31. Lens unit 13 allows stepped portion 69 to abut dome bracket 21. Accordingly, in imaging device 11, the position of lens unit 13 is determined to be parallel to the case installation surface, and thus the positional accuracy of dome cover 19 and lens unit 13 can be ensured.

In imaging device 11, when an impact is applied to dome cover 19 from the outside of case 17, dome cover 19 is distorted and the impact is also applied to dome bracket 21. When the impact is applied to dome bracket 21, a force that makes lens unit 13 retreat by means of stepped portion 69 is exerted. Therefore, when the impact is applied, lens unit 13 retreats in a downward direction (toward bottom plate portion 31 side). Accordingly, the impact is reduced before the deformed dome cover 19 abuts lens 51 of lens unit 13.

Since the force that makes dome bracket 21 be lowered (in a direction toward bottom plate portion 31) is exerted, lens unit 13 that abuts stepped portion 69 compresses lens holding spring 23. In a structure according to the related art, when a dome cover is distorted, first, the dome cover abuts the lens of a lens unit. Contrary to this, in imaging device 11, dome bracket 21 receives the impact and presses a portion of lens unit 13 (stepped portion 69) other than lens 51. Accordingly, when the impact is applied to dome cover 19, lens unit 13 retreats via dome bracket 21, and thus a direct impact added to lens 51 is reduced. That is, imaging device 11 has enhanced vandal proof performance (impact resistance).

In imaging device 11, the lens holding spring 23 is disposed coaxially with lens unit 13 and allows lens unit 13 to be biased in a direction along the axis thereof. Since the lens holding spring 23 has the same axis as that of lens unit 13, an impact applied to an arbitrary position of lens unit 13 in the circumferential direction thereof is equally absorbed.

In addition, in imaging device 11, since lens holding spring 23 is provided coaxially with lens unit 13, the number of lens holding springs 23 is one. Accordingly, in imaging device 11, the biasing mechanism of lens unit 13 can be realized with a small number of components.

In imaging device 11, case 17 has a divided structure including two members, that is, lower case 15 and upper case 35. Dome cover 19, inner dome 81, and the like are mounted on upper case 35. Lens unit 13, lens holding spring 23, and the like are mounted on lower case 15. After predetermined assembly members of each of lower case 15 and upper case 35 are assembled, lower case 15 and upper case 35 are assembled into one body. Accordingly, case 17 enables the pre-assembly of lower case 15 and upper case 35.

In imaging device 11, lens unit 13 is held to be movable in a direction approaching and away from dome cover 19 by lens holder 43. Lens unit 13 is biased by lens holding spring 23 in a state of being held by lens holder 43. Lens unit 13 held by lens holder 43 is pressed against dome bracket 21 as upper case 35 is assembled. As a result, lens unit 13 retreats in a direction in which lens unit 13 compresses lens holding spring 23. As described above, imaging device 11 can be easily assembled to enter a state in which a pre-load is applied to lens unit 13.

In imaging device 11, the positional relationship between lens unit 13 and dome cover 19 is held with high accuracy, and image quality deterioration due to positional deviation can be reduced, resulting in an enhancement in the quality of a captured image.

In imaging device 11, dome cover 19 is designed so that the optical path thereof is integrated with that of lens 51, and thus functions as a lens. Specifically, it is preferable that the ratio (Tmax-Tmin)/r of the difference (Tmax-Tmin) between the maximum thickness Tmax and the minimum thickness Tmin of dome cover 19 to the radius r of dome cover 19 is 0.75% or higher and 6% or lower. In addition, when the thickness of dome cover 19 varies, a ghost image is easily generated. Therefore, it is preferable that an anti-reflection coating (AR coating) is applied to the inner and outer surfaces of dome cover 19. In a case of a imaging device which performs panning and tilting, the direction of the lens thereof is changed while the direction of dome cover 19 is not changed. Therefore, image quality deterioration such as defocus occurs. However, imaging device 11 can be configured as an omnidirectional camera which does not need panning and tilting. In this case, dome cover 19 functions as a portion of a lens and thus high image quality of an image captured by imaging device 11 can be realized.

In imaging device 11, lens unit 13 having capturing element 63 is rotatable about its optical axis and is provided in accommodation space 29 of case 17. Accordingly, since lens unit 13 is configured as an omnidirectional camera, rotation of an image (image rotation) is possible.

As illustrated in FIG. 15A, lens unit 13 is rotated by adjusting gear unit 27 disposed in accommodation space 29. Adjusting gear unit 27 includes adjusting gear 109 for adjusted rotation. As illustrated in FIG. 14A, adjusting gear 109 is exposed to the outside of case 17 from accommodation space 29. Adjusting gear 109 exposed to the outside of case 17 is covered by sub-cover 25 which is mounted on a portion of case 17.

Therefore, as illustrated in FIG. 14A, adjusting gear 109 can be rotated by detaching sub-cover 25 without opening case 17. Accordingly, the infiltration of water or dust into accommodation space 29, which may occur when case 17 is opened, can be suppressed. In addition, a complex operation for adjusting and rotating lens unit 13 (for example, disassembly and re-assembly of case 17) can be simplified.

In imaging device 11, image quality may be deteriorated when a captured image is rotated during image processing. For this, imaging device 11 is provided with mechanical adjusting gear unit 27, and thus a captured image can be rotated while suppressing image quality deterioration. Lens unit 13 of imaging device 11 may be configured as an omnidirectional camera and may not perform rotation in a tilt direction.

In imaging device 11, after lens unit 13 is rotated to a predetermined position, sub-cover 25 may be closed. When sub-cover 25 is closed, protrusions 113 provided in sub-cover 25 illustrated in FIG. 14B mesh with adjusting gear 109 and restrict (lock) the rotation of adjusting gear unit 27 as illustrated in FIG. 15B. Accordingly, the rotational position of lens unit 13 adjusted to a predetermined position can be prevented from deviating due to vibrations and impacts.

In imaging device 11, when sub-cover 25 is mounted on case 17, adjusting gear 109 is covered by sub-cover 25. Adjusting gear 109 is disposed on the inside of annular sub-cover packing 97 provided in case 17. When sub-cover 25 is mounted on case 17, blocking portion 117 of sub-cover 25 comes into close contact with annular end surface 115 of sub-cover packing 97. That is, adjusting gear 109 is sealed by a closed space formed by sub-cover packing 97 and blocking portion 117. In imaging device 11, the water-proof performance and dust-proof performance of adjusting gear penetration portion 103 are achieved by a seal structure provided in the periphery of adjusting gear 109. Therefore, in imaging device 11, the closed structure can be reduced in size, and thus a seal member can also be reduced in size, thereby reducing the probability of the infiltration of water or dust.

As described above, according to imaging device 11, the positional deviation of lens unit 13 can be prevented, and thus impact resistance thereof can be enhanced. In addition, according to imaging device 11, lens unit 13 can be rotated while the infiltration of foreign matter into imaging device 11 is suppressed.

This disclosure is not limited to the configuration of the above-described exemplary embodiment, and any configuration which can achieve the functions described in the appended claims or the functions of the configuration of this exemplary embodiment can be applied.

In the above-described exemplary embodiment, imaging device 11 which has both the positioning structure and the adjusting gear structure is exemplified. However, any one of the positioning structure and the adjusting gear structure may also be omitted.

What is claimed is:

1. An imaging device comprising:
   a case which includes a bottom plate portion and a top plate portion with an accommodation space interposed therebetween;
   a dome cover which protrudes outward from the case through an opening formed in the top plate portion;
   a lens unit which includes a lens;
   an annular support member surrounding the lens unit which allows a circumferential edge portion of the dome cover to be interposed between the support member and the top plate portion;
   and
   an elastic member which is disposed between the bottom plate portion and the lens unit and allows the lens unit to be biased in a direction approaching the dome cover, wherein the lens unit includes an outer circumferential portion which is disposed on outside of the lens in a direction along the bottom plate portion and is engaged with an inside opening of the support member, and a stepped portion which is provided in the outer circumferential portion and restricts movement of the lens unit in the direction approaching the dome cover by abutting the support member.

2. The imaging device according to claim 1, further comprising:

a lens holder which is fixed to the bottom plate portion and holds the lens unit via the elastic member, wherein the lens unit includes an engagement member in an end portion on the bottom plate portion side, and the lens holder includes, in an end portion on the top plate portion side, an engagement portion which is engaged with the engagement member by a biasing force of the elastic member.

3. The imaging device according to claim 1, wherein the elastic member is a coil spring which is disposed coaxially with the lens unit.

4. The imaging device according to claim 1, wherein the case includes a first case having the bottom plate portion and a second case having the top plate portion, the dome cover and the support member are provided in the first case, and the lens unit and the elastic member are provided in the second case.

5. The imaging device according to claim 1, wherein the dome cover is formed so that a ratio of a difference between thicknesses of the dome cover to a radius of the dome cover is 0.75% or higher and 6% or lower.

6. The imaging device according to claim 1, wherein the shape of the annular support member conforms to the circumferential edge portion of the dome cover.

7. The imaging device according to claim 1, wherein the annular support member is positioned entirely behind the dome cover.

8. The imaging device according to claim 1, wherein the annular support member is a plate.

9. The imaging device according to claim 1, wherein the stepped portion extends in a radial direction.

10. An imaging device comprising:

a case which includes a bottom plate and a top plate with an accommodation space interposed therebetween;

a dome cover which protrudes outward from the case through an opening formed in the top plate;

a ring-shaped annular support which allows a circumferential edge of the dome cover to be interposed between the ring-shaped annular support and the top plate;

a lens unit which includes a lens; and a spring which is disposed between the bottom plate and the lens unit and allows the lens unit to be biased in a direction approaching the dome cover, wherein the lens unit further includes:

an outer circumferential support disposed on outside of the lens in a direction along the bottom plate and engaged with an inside opening of the ring-shaped annular support, and a flange provided in the outer circumferential support which restricts movement of the lens unit in the direction approaching the dome cover by abutting the ring-shaped annular support.

11. The imaging device according to claim 10, further comprising a lens holder which is fixed to the bottom plate and which holds the lens unit via the spring, wherein:

the lens unit includes a tab in an end on the bottom plate, and the lens holder includes, in an end portion on the top plate, a recess which is engaged with the tab by a biasing force of the spring.

12. The imaging device according to claim 10, wherein the spring is a coil spring which is disposed coaxially with the lens unit.

13. The imaging device according to claim 10, wherein:

the case includes a first case including the bottom plate and a second case including the top plat, the dome cover and the ring-shaped annular support are provided in the first case, and the lens unit and the spring are provided in the second case.

14. The imaging device according to claim 10, wherein the dome cover is formed such that a ratio of a difference between thicknesses of the dome cover to a radius of the dome cover is 0.75% or higher and 6% or lower.

15. The imaging device according to claim 10, wherein the shape of the ring-shaped annular support conforms to the circumferential edge of the dome cover.

16. The imaging device according to claim 10, wherein the ring-shaped annular support is positioned entirely behind the dome cover.

17. The imaging device according to claim 10, wherein the ring-shaped annular support member is a plate.

18. The imaging device according to claim 10, wherein the flange extends in a radial direction.

* * * * *